US012599533B2

(12) United States Patent

Wei et al.

(10) Patent No.: US 12,599,533 B2
(45) Date of Patent: Apr. 14, 2026

(54) WEARABLE ELECTRICAL ANKLE PUMP MASSAGE BIDIRECTIONAL EXERCISER

(71) Applicant: Hangzhou Vocational and Technical College, Hangzhou (CN)

(72) Inventors: Guofang Wei, Hangzhou (CN); Wenjing Chu, Hangzhou (CN)

(73) Assignee: Hangzhou Vocational and Technical College, Hangzhou (CN)

( * ) Notice: Subject to any disclaimer, the term of this patent is extended or adjusted under 35 U.S.C. 154(b) by 561 days.

(21) Appl. No.: 18/334,537

(22) Filed: Jun. 14, 2023

(65) Prior Publication Data

US 2024/0180770 A1 Jun. 6, 2024

(30) Foreign Application Priority Data

Dec. 6, 2022 (CN) ......................... 202211556353.0

(51) Int. Cl.
*A61H 1/02* (2006.01)
*A61H 9/00* (2006.01)

(52) U.S. Cl.
CPC ......... *A61H 1/0266* (2013.01); *A61H 9/0078* (2013.01); *A61H 2201/0192* (2013.01); *A61H 2201/1238* (2013.01); *A61H 2201/1642* (2013.01); *A61H 2201/165* (2013.01); *A61H 2201/1664* (2013.01); *A61H 2203/0456* (2013.01)

(58) Field of Classification Search
CPC ........ A61H 9/00; A61H 9/005; A61H 9/0007; A61H 9/0078; A61H 9/0085; A61H 1/02; A61H 1/0266; A61H 2209/00
See application file for complete search history.

(56) References Cited

U.S. PATENT DOCUMENTS 3,625,203 A * 12/1971 Wadelton ............. A61H 1/0237 601/31
3,917,261 A * 11/1975 Small ..................... A63B 23/08 482/79

(Continued)

FOREIGN PATENT DOCUMENTS

GB 2031742 A * 4/1980 ......... A63B 21/4047

OTHER PUBLICATIONS

English translation of Yamamoto et al. (WO 2019/187030 A1) (Year: 2019).*

*Primary Examiner* — Timothy A Stanis
*Assistant Examiner* — Christopher E Miller
(74) *Attorney, Agent, or Firm* — GRUMBLES LAW PLLC; Brittany Haanan

(57) ABSTRACT

The present disclosure relates to a wearable electrical ankle pump massage bidirectional exerciser. The adopted technical solution is that the wearable electrical ankle pump massage bidirectional exerciser includes a vamp plate and a calf plate. A base is rotatably connected to a lower side of the vamp plate, a swing airbag for driving the vamp plate is arranged on an upper part of a rear side of the base, side supporting plates are arranged on both sides of the vamp plate, and side massage airbags are arranged on both sides of an upper part of the calf plate. An equipment box is provided on a bottom of the base, a first air pump group is arranged inside the equipment box, and the first air pump group is configured to drive the swing airbag and the side massage airbags.

6 Claims, 6 Drawing Sheets

(56) References Cited

U.S. PATENT DOCUMENTS

| | | | | | |
|---|---|---|---|---|---|
| 4,003,374 | A * | 1/1977 | Mizrachy | A61H 15/00 | 601/126 |
| 4,372,297 | A * | 2/1983 | Perlin | A61H 9/0078 | 128/DIG. 20 |
| 4,635,931 | A * | 1/1987 | Brannstam | A63B 21/00069 | 482/79 |
| 4,702,232 | A * | 10/1987 | Gardner | A61H 9/0078 | 601/152 |
| 4,795,148 | A * | 1/1989 | Rangaswamy | A63B 23/085 | 482/80 |
| 4,977,891 | A * | 12/1990 | Grim | A61F 5/34 | 602/27 |
| 5,267,923 | A * | 12/1993 | Piaget | A63B 21/0085 | 482/52 |
| 5,267,924 | A * | 12/1993 | Miller | A61H 1/0262 | 482/79 |
| 5,441,466 | A * | 8/1995 | Piaget | A63B 21/0085 | 297/DIG. 8 |
| 5,711,760 | A * | 1/1998 | Ibrahim | A61H 9/0085 | 601/149 |
| 6,010,468 | A * | 1/2000 | Grove | A61H 9/0078 | 601/23 |
| 6,589,194 | B1 * | 7/2003 | Calderon | A61H 9/0085 | 601/151 |
| 7,614,978 | B2 * | 11/2009 | Piaget | A63B 21/0085 | 482/80 |
| 2002/0165069 | A1 * | 11/2002 | Ravikumar | A63B 23/10 | 482/80 |
| 2004/0171971 | A1 * | 9/2004 | Ravikumar | A61H 1/0266 | 601/152 |
| 2011/0118635 | A1 * | 5/2011 | Yamamoto | A61H 1/0262 | 601/5 |

* cited by examiner

WEARABLE ELECTRICAL ANKLE PUMP MASSAGE BIDIRECTIONAL EXERCISER

CROSS-REFERENCE TO RELATED APPLICATION

This patent application claims the benefit and priority of Chinese Patent Application No. 202211556353.0, filed with the China National Intellectual Property Administration on Dec. 6, 2022, the disclosure of which is incorporated by reference herein in its entirety as part of the present application.

TECHNICAL FIELD

The present disclosure belongs to the technical equipment field of ankle pump exercisers, and relates to a wearable electrical ankle pump massage bidirectional exerciser.

BACKGROUND

Long-term inactivity of lower limbs not only leads to muscle atrophy and loss of motor function of lower limbs, but also cause deep vein thrombosis of lower limbs, which is common in patients with paraplegia and hemiplegia, surgical patients with lower limb fractures, arthroplasty (including hip and knee joints), muscle or ligament tendon surgery, patients who need to be bedridden after various other major operations, and patients who are bedridden for a long time due to other reasons.

There are two ways for these patients clinically for prevention:

First, use of pneumatic pump: the pneumatic pump is an instrument capable of generating pressure through inflation, which can squeeze blood vessels of lower limbs so as to promote blood circulation and lymphatic reflux of lower limbs. However, such a method has many limitations. First, this is passive exercise, the muscles of lower limbs do not work, and the effect of promoting circulation is poor. Second, the pneumatic pump only squeezes muscles but cannot enhance muscle strength and prevent muscle atrophy. Third, the pneumatic pump cannot be used if the patient is in severe pain, because local simulation produced by inflatable compression will increase the pain. Fourth, if the leg is in a cast or fixed by splint, or is not convenient to move, the pneumatic pump cannot be used.

Second, ankle pump exercise: ankle pump exercise is to promote blood circulation and lymphatic reflux of lower limbs through ankle joint exercise, which not only can prevent and eliminate lower limb injury and pain and postoperative swelling, but also is crucial for functional recovery of the patient after lower limb surgery. However, such as method has many limitations. First, the compliance of patient is poor, and most patients are afraid of fatigue and do not want to exercise actively. Secondly, when the patient is unconscious, comatose, and too afraid of pain to cooperate, the ankle pump exercise cannot be carried out, and thus the treatment and rehabilitation of the patient are affected. Thirdly, most of the current ankle pump exercisers need manual assistance and has poor exercise effect, leading to easy waste of manpower and slow rehabilitation effect.

To sum up, in order to solve the problems existing in the prior art, it is urgent to invent a wearable electrical ankle pump exerciser which can be used to promote blood circulation and lymphatic reflux of lower limbs, reduce swelling and pain of lower limbs, and has obvious technical benefits, so as to prevent deep vein thrombosis of lower limbs, realize multi-directional exercise of lower limbs, achieve simultaneous rehabilitation of both pneumatic pump and ankle pump exercise, exercise calf muscles, avoid muscle atrophy, and prevent loss of motor function.

SUMMARY

The technical problem to be solved by the present disclosure is to provide a wearable electrical ankle pump massage bidirectional exerciser to overcome the defects in the prior art. The present disclosure has the beneficial effects that by arranging side massage airbags and a swing airbag, the device can simultaneously carry out ankle pump exercise and leg massage, and thus the function of the device is promoted. Two side massage airbags and the swing airbag are independently controlled by respective air pumps, thus achieving the alternate work of the airbags. The rehabilitation effect is precisely controlled and improved through the expansion and contraction of the airbags. By adding lifting airbags and a second air pump group, the lateral exercise and height adjustment functions of the device can be increased.

To achieve the objective above, the present disclosure provides the following technical solution: a wearable electrical ankle pump massage bidirectional exerciser includes a vamp plate and a calf plate. A base is rotatably connected to a lower side of the vamp plate. A swing airbag for driving the vamp plate is arranged at an upper part of a rear side of the base. Side supporting plates are arranged on both sides of the vamp plate, and side massage airbags are arranged on both sides of an upper part of calf plate.

An equipment box is provided on a bottom of the base, a first air pump group is arranged inside the equipment box, and the first air pump group is configured to drive the swing airbag and the side massage airbags.

As a preferred technical solution of the present disclosure, a first cushion is arranged at an inner foot surface of the vamp plate, and a second cushion is arranged at an inner heel of the vamp plate.

As a preferred technical solution of the present disclosure, a side face of each side massage airbag is connected to the vamp plate and the calf plate by connecting belts, an upper part of each side massage airbag is provided with fixing belts, and a lower part of each side massage airbag communicates with the first air pump group in the base through a first air duct.

As a preferred technical solution of the present disclosure, an upper part of the base is rotationally connected to the vamp plate through a rotating shaft, and a control plate is arranged on a rear side of the base.

As a preferred technical solution of the present disclosure, side supporting sheets are fixed to lower sides of front parts of the two side supporting plates.

As a preferred technical solution of the present disclosure, the swing airbag expands and extends towards a direction corresponding to the vamp plate and the base, and the side massage air bags expand and extend towards inward directions.

As a preferred technical solution of the present disclosure, a lower side of each side supporting sheet is provided with a lifting airbag, and a second air pump group is arranged on the inner side of the equipment box, and the lifting airbag communicates with the second air pump group through a second air duct.

As a preferred technical solution of the present disclosure, the lifting airbag expands and extends downward.

Compared with the prior art, the present disclosure has the beneficial effects that by arranging side massage airbags and a swing airbag, the device can simultaneously carry out ankle pump exercise and leg massage, and thus the function of the device is promoted. Two side massage airbags and the swing airbag are independently controlled by respective air pumps, thus achieving the alternate work of the airbags. The rehabilitation effect is precisely controlled and improved through the expansion and contraction of the airbags.

The electrical ankle pump massage bidirectional exerciser is simple in structure, convenient to use, and is capable of assisting patients to exercise. The exerciser can be used to actively exercise muscles of lower limbs, promote blood circulation and lymphatic reflux of lower limbs, enhance muscle strength, prevent muscle atrophy and promote functional recovery of lower limbs. Patients have good compliance and are willing to exercise. When the patients are unconscious, comatose, and too afraid of pain to cooperate, ankle pump exercise can also be carried out to promote the treatment and rehabilitation of the patients. The electric ankle pump massage bidirectional exerciser does not need manual assistance, is convenient to use, saves manpower and has good exercise and rehabilitation effect.

1—vamp plate; 101—first cushion; 102—second cushion;

2—calf plate; 201—flexible connecting board;

3—side massage airbag; 301—connecting belt; 302—fixing belt; 303—first air duct;

4—base; 401—rotating shaft; 402—equipment box; 403—first air pump group; 404—second air pump group;

5—side supporting plate; 501—side supporting sheet;

6—control plate;

7—swing airbag;

8—lifting airbag; 801—second air duct.

DETAILED DESCRIPTION OF THE EMBODIMENTS

Figure 1:
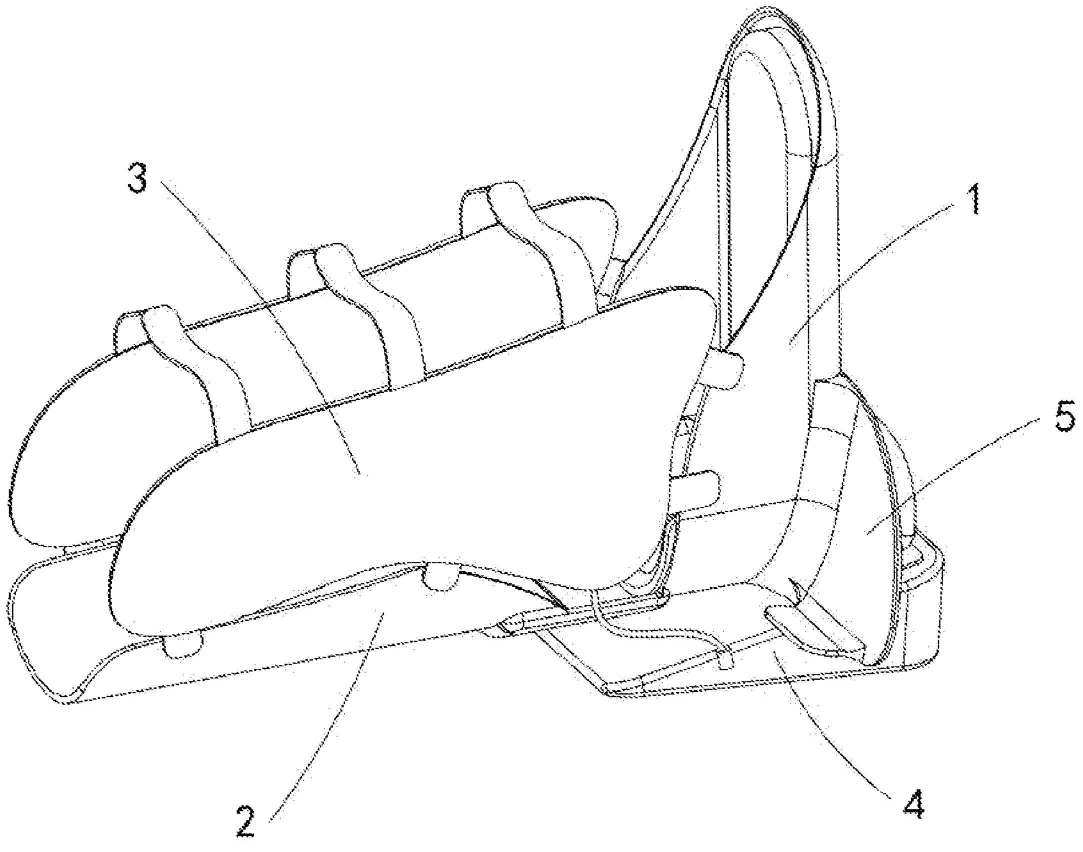
FIG. 1 is a schematic diagram of an overall structure in accordance with an embodiment 1 of the present disclosure.
Figure 2:
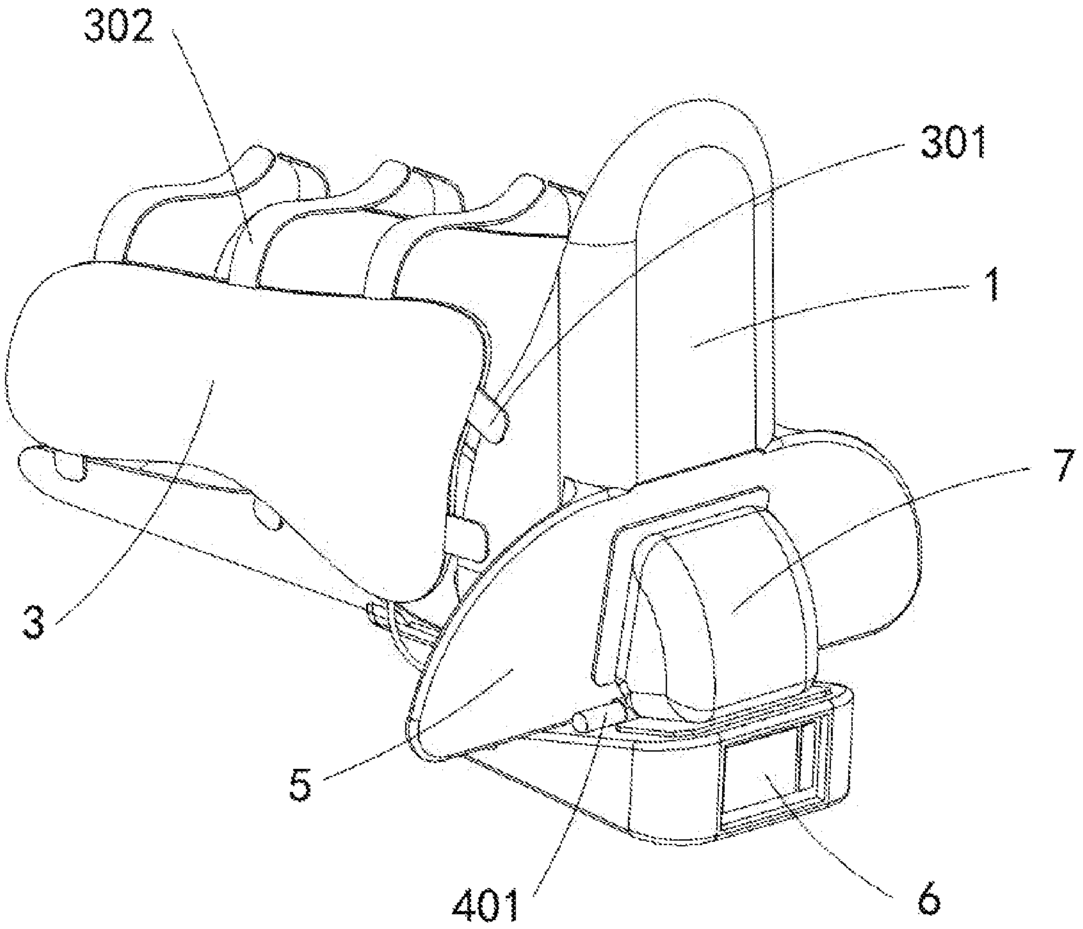
FIG. 2 is a structure schematic diagram of a swing airbag in accordance with an embodiment 1 of the present disclosure.
Figure 3:
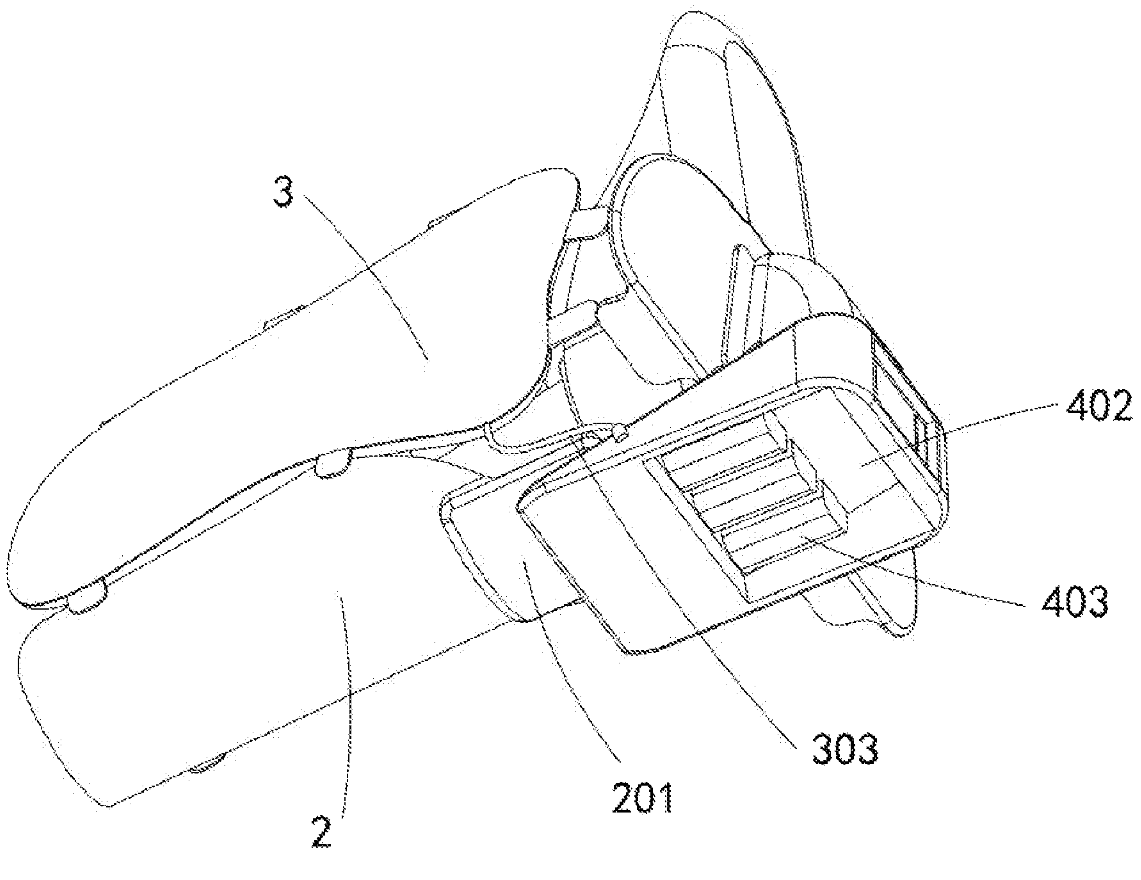
FIG. 3 is a layout schematic diagram of an equipment box in accordance with an embodiment 1 of the present disclosure.
Figure 4:
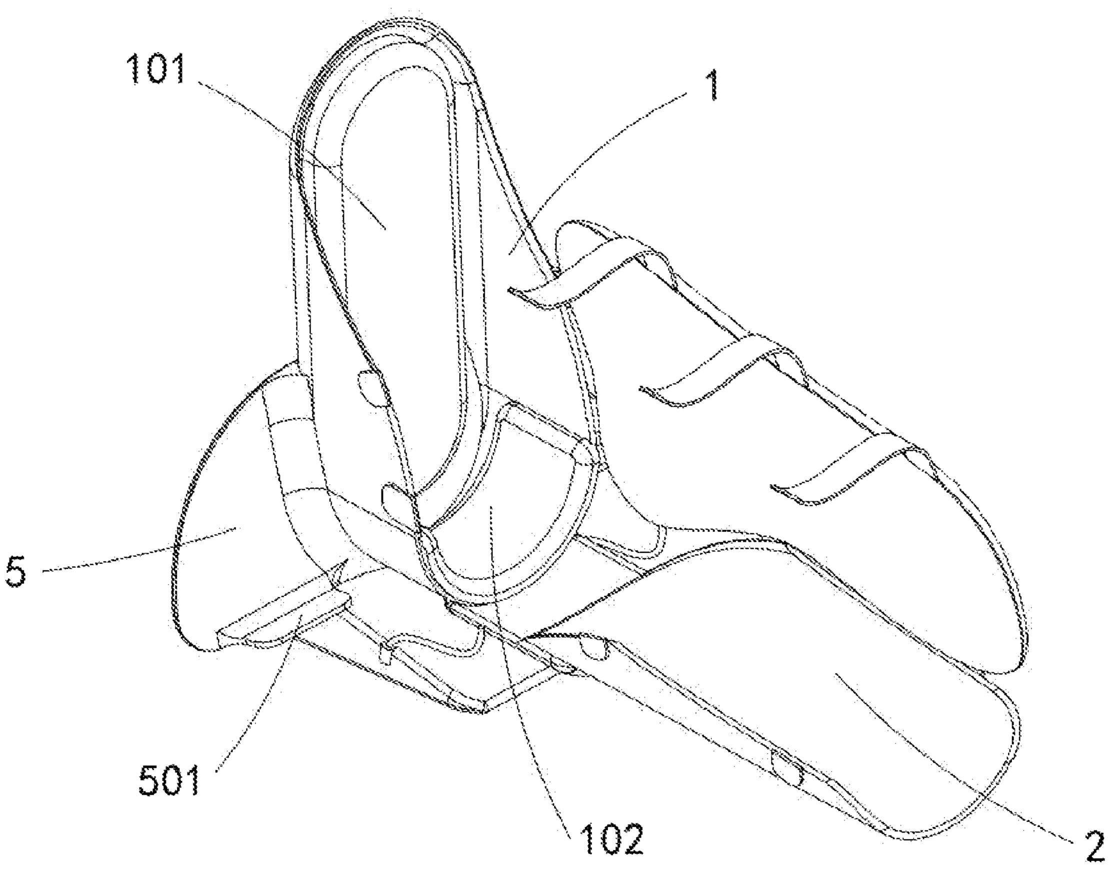
FIG. 4 is a structure schematic diagram of a vamp plate in accordance with the present disclosure.

The following clearly and completely describes the technical solutions in the embodiments of the present disclosure with reference to the accompanying drawings in the embodiments of the present disclosure. Apparently, the described embodiments are merely a part rather than all of the embodiments of the present disclosure (For the convenience of description and understanding, the following description will be made with the upper part of FIG. 1 as the upper part). All other embodiments obtained by a person of ordinary skill in the art based on the embodiments of the present disclosure without creative efforts shall fall within the protection scope of the present disclosure.

Embodiment 1

As shown in FIG. 1 through FIG. 4, a wearable electrical ankle pump massage bidirectional exerciser of the present disclosure employs a technical solution as follows: the exerciser includes a vamp plate 1 and a calf plate 2. A base 4 is rotatably connected to a lower side of the vamp plate 1, a swing airbag 7 for driving the vamp plate 1 is arranged at an upper part of a rear side of the base 4, side supporting plates 5 are arranged on both sides of the vamp plate 1, and side massage airbags are arranged on both sides of an upper part of calf plate 2. An equipment box (402) is provided on a bottom of the base (4), a first air pump group (403) is arranged inside the equipment box (402), and the first air pump group (403) is configured to drive the swing airbag (7) and the side massage airbags 3. By providing the side massage airbags 3 and the swing airbag 7, the device can simultaneously carry out ankle pump exercise and leg massage, and thus the function of the device is promoted. Two side massage airbags 3 and the swing airbag 7 are independently controlled by respective air pumps, thus achieving the alternate work of the airbags. The rehabilitation effect is precisely controlled and improved through the expansion and contraction of the airbags.

Further, a first cushion 101 is arranged at an inner foot surface of the vamp plate 1, and a second cushion 102 is arranged at an inner heel of the vamp plate 1, thus making a part in contact with skin more comfortable.

Further, a side face of each side massage airbag 3 is connected to the vamp plate 1 and the calf plate 2 by connecting belts 301, an upper part of each side massage airbag 3 is provided with fixing belts 302, and a lower part of each side massage airbag 3 communicates with the first air pump group 403 in the base 4 through a first air duct 303. The two side massage airbags 3 are independently controlled by two air pumps in the first air pump group 403.

Further, an upper part of the base 4 is rotationally connected to the vamp plate 1 through a rotating shaft 401, and a rear side of the base 4 is provided with a control plate 6. The swing airbag 7 expands and extends towards a direction corresponding to the vamp plate 1 and the base 4, and the side massage airbags 3 expand and extend towards inward directions. The base 4 and the vamp plate 1 are driven by the swing airbag 7 to complete swinging, and the amplitude of expansion and contraction of the swing airbag 7 is independently controlled by the air pump in the first air pump group 403.

Further, side supporting sheets 501 are fixed to lower sides of front parts of the two side supporting plates 5.

During use, the wearable electrical ankle pump massage bidirectional exerciser is placed on a sickbed of a patient by nursing staff, and a lower limb of the patient is fixed to the vamp plate 1 and the calf plate 2 through the fixing belts 302. The equipment is electrified, and various air pumps of the equipment are controlled through the control plate 6. The first air pump group 403 is used to supply air pressure to the side massage airbags 3 and the swing airbag 7 to control expansion and contraction, the swing airbag 7 expands to drive the vamp plate 1 to swing and thus drive the foot of the patient to move, and the side massage airbags 3 expand periodically to massage the calf of the patient.

Embodiment 2

Figure 5:
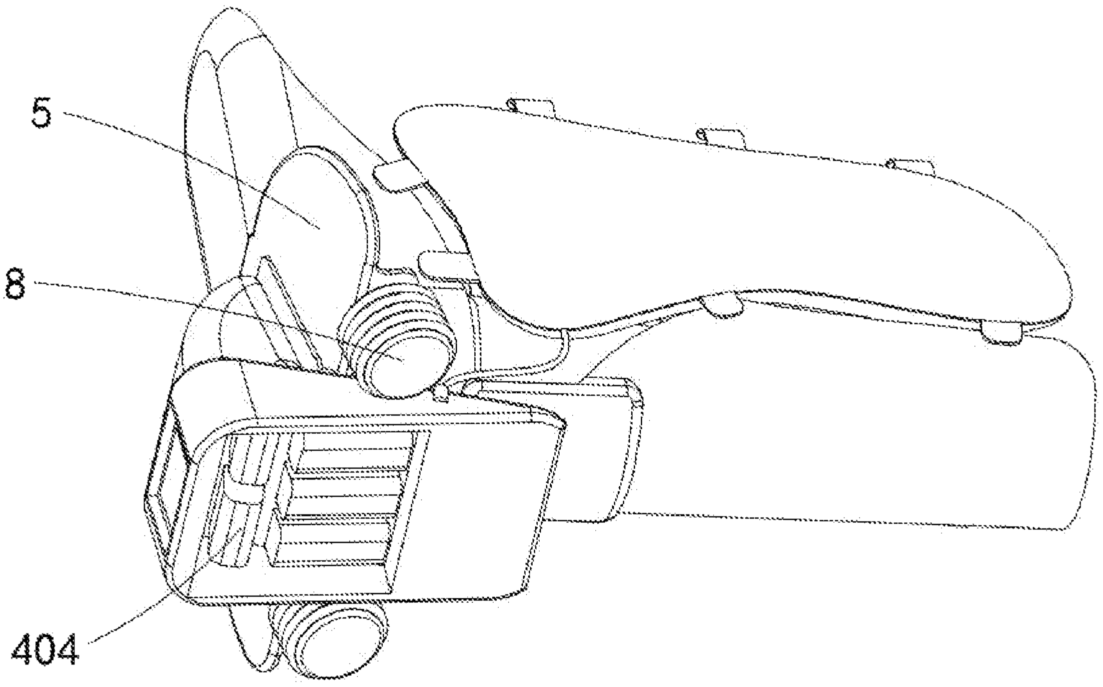
FIG. 5 is a layout schematic diagram of a lifting airbag and a second air pump group in accordance with an embodiment 2 of the present disclosure.
Figure 6:
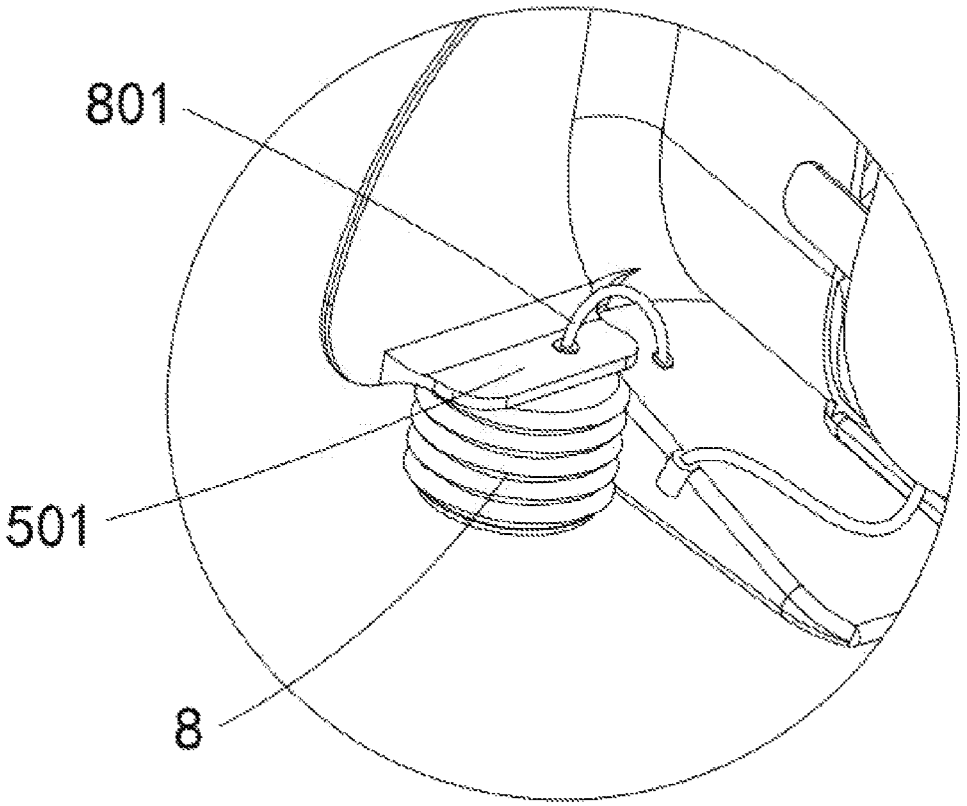
FIG. 6 is a partial view of a structure of a lifting airbag in accordance with an embodiment 2 of the present disclosure.

As shown in FIG. 5 and FIG. 6, the difference from the embodiment 1 is that the lifting airbags 8 are arranged at lower sides of the side supporting plates 501, and a second air pump group 404 is arranged inside the equipment box 402. The lifting airbags 8 communicate with the second air pump group 404 through second air ducts 801, and the lifting airbags 8 expand and extend downward. Two air pumps in the second air pump group 404 are used to supply air pressure to the lifting airbags 8 to control expansion and contraction. The two lifting airbags 8 can alternately expand to achieve swing, and can also expand and contract simultaneously to adjust a supporting height of the vamp plate 1. Through the lifting airbags 8 on both sides, the lateral exercise function is increased, the rehabilitee exercise of the patient in a lateral direction is increased, and the recovery performance of the exerciser is improved.

A circuit control mode not described in detail herein is the prior art.

The present disclosure has the beneficial effects that the device can simultaneously carry out ankle pump exercise and leg massage by arranging side massage airbags and a swing airbag, the device can simultaneously carry out ankle pump exercise and leg massage, and thus the function of the device is promoted. Two side massage airbags and the swing airbag are independently controlled by respective air pumps, thus achieving the alternate work of the airbags. The rehabilitation effect is precisely controlled and improved through the expansion and contraction of the airbags. By adding lifting airbags and a second air pump group, the lateral exercise and height adjustment functions of the device can be increased.

Although embodiments of the present disclosure have been shown and described, it should be understood to those of ordinary skill in the art that various variations, modifications, substitutions and modifications may be made to these embodiments without departing from the principle and spirit of the present disclosure, the scope of which is defined by the appended claims and their equivalents.

What is claimed is:

1. A wearable electrical ankle pump massage bidirectional exerciser, comprising a vamp plate (1) and a calf plate (2), wherein a base (4) is rotatably connected to a lower side of the vamp plate (1), a swing airbag (7) for driving the vamp plate (1) is arranged at an upper part of a rear side of the base (4), side supporting plates (5) are arranged on both sides of the vamp plate (1), and side massage airbags (3) are arranged on both sides of an upper part of calf plate (2);

an equipment box (402) is provided on a bottom of the base (4), a first air pump group (403) and a second air pump group are arranged inside the equipment box (402), and the first air pump group (403) is configured to drive the swing airbag (7) and the side massage airbags (3); and wherein side supporting sheets are fixed to lower sides of front parts of the two side supporting plates and a lifting airbag is arranged at a lower side of each side supporting sheet, and the second air pump group communicates with each lifting airbag through a second air duct.

2. The wearable electrical ankle pump massage bidirectional exerciser according to claim 1, wherein a first cushion (101) is arranged at an inner foot surface of the vamp plate (1), and a second cushion (102) is arranged at an inner heel of the vamp plate (1).

3. The wearable electrical ankle pump massage bidirectional exerciser according to claim 1, wherein a side face of each side massage airbag (3) is connected to the vamp plate (1) and the calf plate (2) by connecting belts (301), an upper part of each side massage airbag (3) is provided with fixing belts (302), and a lower part of each side massage airbag (3) communicates with the first air pump group (403) in the base (4) through a first air duct (303).

4. The wearable electrical ankle pump massage bidirectional exerciser according to claim 1, wherein an upper part of the base (4) is rotationally connected to the vamp plate (1) through a rotating shaft (401), and a control plate (6) is arranged on a rear side of the base (4).

5. The wearable electrical ankle pump massage bidirectional exerciser according to claim 1, wherein the swing airbag (7) expands and extends towards a direction corresponding to the vamp plate (1) and the base (4), and the side massage air bags (3) expand and extend towards inward directions.

6. The wearable electrical ankle pump massage bidirectional exerciser according to claim 1, wherein the lifting airbag (8) expands and extends downward.

* * * * *